United States Patent
Sun et al.

(10) Patent No.: US 12,355,070 B2
(45) Date of Patent: Jul. 8, 2025

(54) NEGATIVE ELECTRODE MATERIAL, PREPARATION METHOD THEREFOR AND APPLICATION THEREOF, AND LITHIUM-ION BATTERY

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Sai Sun, Shanghai (CN); Siyu Zhang, Shanghai (CN); Huanxin Gao, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 652 days.

(21) Appl. No.: 17/754,742

(22) PCT Filed: Sep. 29, 2020

(86) PCT No.: PCT/CN2020/118720
§ 371 (c)(1),
(2) Date: Apr. 11, 2022

(87) PCT Pub. No.: WO2021/068796
PCT Pub. Date: Apr. 15, 2021

(65) Prior Publication Data
US 2023/0148348 A1    May 11, 2023

(30) Foreign Application Priority Data

Oct. 9, 2019  (CN) .......................... 201910953233.6
Oct. 9, 2019  (CN) .......................... 201910953279.8

(51) Int. Cl.
*H01M 4/36*    (2006.01)
*H01M 4/04*    (2006.01)
(Continued)

(52) U.S. Cl.
CPC ......... *H01M 4/366* (2013.01); *H01M 4/0471* (2013.01); *H01M 4/386* (2013.01);
(Continued)

(58) Field of Classification Search
CPC .... H01M 4/366; H01M 4/0471; H01M 4/386; H01M 4/587; H01M 4/625;
(Continued)

(56) References Cited

U.S. PATENT DOCUMENTS

2013/0323595 A1* 12/2013 Sohn ................. H01M 4/134
429/231.95
2017/0294643 A1* 10/2017 Burshtain ......... H01M 10/0525
(Continued)

FOREIGN PATENT DOCUMENTS

| CN | 101179126 B | 9/2011 |
| CN | 102945949 A | 2/2013 |

(Continued)

OTHER PUBLICATIONS

Harris, Kristopher J. et al.; "Electrochemical Changes in Lithium-Battery Electrodes Studied Using 7Li NMR and Enhanced 13C NMR of Graphene and Graphitic Carbons"; Chemistry of Materials; Apr. 9, 2015; vol. 27; No. 9, pp. 3299-3305.
(Continued)

*Primary Examiner* — James M Erwin
(74) *Attorney, Agent, or Firm* — NKL Law; Allen Xue (57) ABSTRACT

A negative electrode material of the lithium-ion battery, a preparation method therefor and an application thereof, and a lithium-ion battery include the same are provided. The negative electrode material has a core-shell structure. The core has a silicon-containing material while the shell has an organic lithium salt and a porous carbon film, and at least
(Continued)

part of lithium ion is intercalated in the porous carbon film. The negative electrode material is prepared by (1) mixing a silicon source and a carbon source, and then calcining the mixture; (2) mixing the calcined product obtained in the step (1) with the organic lithium salt; and (3) subjecting the materials obtained in the step (2) of mixing to vacuum freeze-drying.

19 Claims, 4 Drawing Sheets

(51) Int. Cl.
*H01M 4/38* (2006.01)
*H01M 4/587* (2010.01)
*H01M 4/62* (2006.01)
*H01M 10/0525* (2010.01)
*H01M 4/02* (2006.01)

(52) U.S. Cl.
CPC ............ *H01M 4/587* (2013.01); *H01M 4/625* (2013.01); *H01M 10/0525* (2013.01); *H01M 2004/021* (2013.01); *H01M 2004/027* (2013.01)

(58) Field of Classification Search
CPC ....... H01M 10/0525; H01M 2004/021; H01M 2004/027
USPC ...................................... 429/231.8
See application file for complete search history.

(56) References Cited

U.S. PATENT DOCUMENTS

| | | |
|---|---|---|
| 2018/0083263 A1 | 3/2018 | Cho et al. |
| 2018/0175390 A1 | 6/2018 | Sun |
| 2019/0044133 A1* | 2/2019 | Burshtain ............. H01M 4/134 |
| 2020/0058941 A1 | 2/2020 | Hayashi et al. |

FOREIGN PATENT DOCUMENTS

| | | |
|---|---|---|
| CN | 103400971 A | 11/2013 |
| CN | 105047887 A | 11/2015 |
| CN | 105932284 A | 9/2016 |
| CN | 106463707 A | 2/2017 |
| CN | 106531992 A | 3/2017 |
| CN | 106898736 A | 6/2017 |
| CN | 107431192 A | 12/2017 |
| CN | 107768625 A | 3/2018 |
| CN | 108063221 A | 5/2018 |
| CN | 108172775 A | 6/2018 |
| CN | 108461723 A | 8/2018 |
| CN | 109952670 A | 6/2019 |
| CN | 111146422 A | 5/2020 |
| CN | 111146434 A | 5/2020 |
| CN | 111653738 A | 9/2020 |
| CN | 111916686 A | 11/2020 |
| CN | 112635745 A | 4/2021 |
| CN | 112652755 A | 4/2021 |
| JP | 2010287505 A | 12/2010 |
| WO | 2016152056 A1 | 9/2016 |
| WO | 2016153322 A1 | 9/2016 |
| WO | 2018061536 A1 | 4/2018 |
| WO | 2018146865 A1 | 8/2018 |
| WO | 2020091876 A1 | 5/2020 |

OTHER PUBLICATIONS

He, Dan et al.: "Hierarchical C-P(=O)(-O-)n (n≤2)-linked nano-Si/ N-doped C/ graphene porous foam as anodes for high-performance lithium ion batteries"; Carbon; vol. 141; Year: 2019, available online on Oct. 4, 2018; pp. 531-541.

Zhou, Jin R. et al.; "Phytic acid in health and disease"; Critical Reviews in Food Science and Nutrition; 1995; vol. 35, No. 6; pp. 495-508.

* cited by examiner

NEGATIVE ELECTRODE MATERIAL, PREPARATION METHOD THEREFOR AND APPLICATION THEREOF, AND LITHIUM-ION BATTERY

TECHNICAL FIELD

The present disclosure relates to the field of lithium ion batteries. More particular, the present disclosure relates to a negative electrode material in a core-shell structure, a preparation method therefor and an application thereof, and a lithium-ion battery.

BACKGROUND

Silicon has a theoretical specific capacity of 4200 mAh/g, which is the battery negative electrode material with the highest capacity per gram at present. Once successfully applied, it can significantly improve the energy density of a lithium battery, making it possible to achieve a range of 1000 kilometers on one charge. However, silicon has charging/discharging mechanism which is different from graphite. Solid electrolyte interface (SEI) films may continuously form at the interface between Si and Li ions in electrolyte during charging and discharging. The formation of irreversible SEI may consume a lot of Li ions from electrolyte and positive electrode materials. Therefore, the initial cycle coulombic efficiency (also referred as the initial coulombic efficiency, ICE) of silicon-based negative electrode materials is usually only 65-85%, which results in a large capacity loss. In addition, silicon has conductivity and lithium ion diffusion rate that are both lower than those of graphite, which may limit the performance of silicon under high current and high power conditions.

In order to solve the above problems, it has been proposed by scientific researchers to improve the comprehensive electrical performances of silicon-based negative electrode materials by doping, nanosizing and the like. The Chinese patent CN101179126B discloses a doped silicon-based negative electrode material for lithium ion batteries. By doping at least one element of boron, aluminum, gallium, antimony and phosphorus, the initial coulombic efficiency of the material is improved. CN101179126B needs high vacuum argon arc fusion welding in the preparation process, which requires high reaction temperature (>1000° C.), complex reactions (involving fusion welding, low-temperature blowing, rapid cooling, planetary ball milling and other operations), and thereby high cost. CN108172775A discloses a phosphorus doped silicon-based negative electrode material. Its examples show that the phosphorus doped silicon-based negative electrode has an initial coulombic efficiency of 91.7% with a specific capacity of 610.1 mAh/g. The preparation process of CN108172775A requires spray drying and results in low yield but high cost. CN103400971A discloses lithium silicate doped negative electrode materials. When silicon is added in an amount of 50% and $Li_2SiO_3$ in an amount of 35%, the resulting material has a specific capacity of 1156.2 mAh/g and an initial coulombic efficiency of 88.2%. There is a margin to further improve the cycle stability and initial coulombic efficiency of the material. CN111653738A discloses a negative electrode material of amorphous carbon coated silicon-carbon in core-shell structure. The material has a reversible charging capacity of 1765.54 mAh/g, an ICE of 84.38%, and a charging capacity retention of 82.24% after 50 cycles, for which there is margin for further improvement.

As mentioned above, although some progress has been made in the modification of silicon-based negative electrode materials, it can usually only improve one performance of silicon-based negative electrode materials, rather than improve their comprehensive electrical properties. However, when used in high energy density lithium ion batteries, it is desired that the negative electrode material simultaneously has excellent reversible charging capacity, initial coulombic efficiency and cycle charging capacity retention, especially excellent initial coulombic efficiency and cycle charging capacity retention at the same time. Therefore, there is still demand for developing silicon-based negative electrode materials with simultaneously improved initial coulombic efficiency, reversible charging capacity, cycle charging capacity retention and conductivity. A simple method for preparing such silicon-based negative electrode materials is also needed.

SUMMARY OF THE DISCLOSURE

The disclosure is to solve the problems of low reversible charging capacity and low initial coulombic efficiency of silicon-based negative electrode materials in the prior art. Provided is a negative electrode material in a core-shell structure, a preparation method for the negative electrode material and the negative electrode material obtained by the preparation method, as well as a lithium ion battery. The negative electrode material of the present disclosure has improved reversible charging capacity (also referred as reversible charging specific capacity) and initial coulombic efficiency, and is particularly suitable for lithium ion batteries.

In order to achieve the above purpose, provided in the first aspect of the present disclosure is a negative electrode material which has a core-shell structure, wherein the core comprises a silicon-containing material, the shell comprises an organic lithium salt and a porous carbon film, and wherein at least a part of lithium ion is intercalated in the porous carbon film.

Preferably, the organic lithium salt is at least one selected from the group consisting of lithium polyacrylate, lithium polymethacrylate, lithium polymaleate, lithium polyfumarate, lithium carboxymethylcellulose and lithium alginate.

Provided in the second aspect of the present disclosure is a method for preparing a negative electrode material, comprising:
  (1) mixing a silicon source and a carbon source, and then calcining the mixture;
  (2) mixing the calcined product obtained in the step (1) with an organic lithium salt; and
  (3) subjecting the materials obtained in the step (2) of mixing to vacuum freeze-drying.

Preferably, the carbon source is pitch, preferably at least one selected from the group consisting of petroleum pitch, coal tar pitch, natural pitch and modified pitch.

Provided in the third aspect of the present disclosure is the negative electrode material prepared by the above method.

Provided in the fourth aspect of the present disclosure is the use of the above negative electrode material in a lithium ion battery.

Provided in the fifth aspect of the present disclosure is a lithium ion battery comprising the above negative electrode material, a lithium-containing positive electrode material, a separator and an electrolyte.

Specifically, the present disclosure may be embodied in the following items:

1. A negative electrode material of silicon-carbon, characterized in that the negative electrode material of silicon-carbon has a core-shell structure, wherein the core comprises a silicon-containing material, the shell comprises an organic lithium salt and a porous carbon film.
2. The negative electrode material of silicon-carbon of item 1, wherein the porous carbon film coats the outer surface of the core, and the organic lithium salt is present in the porous carbon film.
3. The negative electrode material of silicon-carbon of item 1, wherein, based on the total amount of the negative electrode material of silicon-carbon, the organic lithium salt is present in an amount of 5-34 wt %, the silicon-containing material is present in an amount of 65-90 wt %, and the porous carbon film is present in an amount of 1-10 wt %;
preferably, based on the total amount of the negative electrode material of silicon-carbon, the organic lithium salt is present in an amount of 10-30 wt %, the silicon-containing material is present in an amount of 68-86 wt %, and the porous carbon film is present in an amount of 1-6 wt %;
preferably, the negative electrode material of silicon-carbon further comprises graphite; further preferably, the graphite is present in the core and/or the shell;
preferably, the mass ratio of the total amount of the silicon-containing material, the organic lithium salt and the porous carbon film to the amount of graphite is 1:1-10, further preferably 1:1-5.
4. The negative electrode material of silicon-carbon of item 1, wherein the negative electrode material of silicon-carbon has a median particle size of 0.1-20 km.
5. The negative electrode material of silicon-carbon of any one of items 1-4, wherein the organic lithium salt is at least one selected from the group consisting of lithium polyacrylate, lithium polymethacrylate, lithium polymaleate, lithium polyfumarate, lithium carboxymethylcellulose and lithium alginate;
preferably, the silicon-containing material is at least one selected from the group consisting of elemental silicon, $SiO_x$ wherein $0.6<x<1.5$, and silicon-containing alloy; preferably, the silicon-containing alloy is at least one selected from the group consisting of silicon-aluminum alloy, silicon-magnesium alloy, silicon-zirconium alloy and silicon-boron alloy.
6. A method for preparing a negative electrode material of silicon-carbon, comprising the steps of:
(1) mixing a silicon source and a carbon source, and then calcining the mixture;
(2) mixing the calcined product obtained in the step (1) with an organic lithium salt; and
(3) subjecting the materials obtained in the step (2) of mixing to vacuum freeze-drying.
7. The method of item 6, wherein the silicon source is at least one selected from the group consisting of elemental silicon, $SiO_x$ wherein $0.6<x<1.5$, and silicon-containing alloy; preferably, the silicon-containing alloy is at least one selected from the group consisting of silicon-aluminum alloy, silicon-magnesium alloy, silicon-zirconium alloy and silicon-boron alloy;
preferably, the carbon source is at least one selected from the group consisting of petroleum pitch, coal tar pitch, natural pitch and modified pitch;
preferably, the mass ratio of the silicon source to the carbon source is 1: (0.04-0.12).
8. The method of item 6, wherein the step (1) of mixing comprises:
adding the silicon source and the carbon source into an organic solvent, and then stirring ultrasonically, preferably for 10-100 min;
preferably, the organic solvent is at least one selected from the group consisting of N,N-dimethylformamide, N,N-dimethylacetamide and N-methylpyrrolidone;
preferably, the calcining is operated under an inert atmosphere at a temperature of 600-1000° C., preferably 700-900° C., for 10-240 min, preferably 20-60 min.
9. The method of any one of items 6-8, wherein the organic lithium salt is at least one selected from the group consisting of lithium polyacrylate, lithium polymethacrylate, lithium polymaleate, lithium polyfumarate, lithium carboxymethylcellulose and lithium alginate;
preferably, the organic lithium salt is used in an amount of 0.05-0.5 parts by weight, preferably 0.1-0.4 parts by weight in relative to 1 part by weight of the silicon source;
preferably, the step (2) of mixing includes: adding the calcined product obtained in the step (1) and the organic lithium salt into the solvent and stirring for 4-48 h.
10. The method of any one of items 6-9, wherein the vacuum freeze-drying of the step (3) is operated at a temperature of not higher than −65° C. and a vacuum degree of not higher than 120 Pa for a time of 4-48 h.
11. The method of any one of items 6-10, further comprises adding graphite in the step (1) and/or the step (2).
12. The method of any one of items 6-10, further comprises the step (4) of: mixing the product obtained in the vacuum freeze-drying in the step (3) with graphite;
preferably, graphite is used in an amount of 1-15 parts by weight, preferably 1-5 parts by weight in relative to 1 part by weight of the product obtained in the vacuum freeze-drying in the step (3).
13. The negative electrode material of silicon-carbon prepared by the method of any one of items 6-12.
14. Use of the negative electrode material of silicon-carbon of any one of items 1-5 and 13 in a lithium ion battery.
15. A lithium ion battery comprising the negative electrode material of silicon-carbon of any one of items 1-5 and 13, a lithium-containing positive electrode material, a separator and an electrolyte;
preferably, the lithium ion battery is a liquid lithium ion battery, a semi-solid lithium ion battery or a solid lithium ion battery.

The negative electrode material in core-shell structure in accordance with the present disclosure comprises lithium element, and at least a part of the lithium element is intercalated in the porous carbon film in the form of ions. It can not only solve the problems of low reversible charging capacity and low initial coulombic efficiency of the traditional silicon-based negative electrode, but also inhibit the pulverization of the electrode material caused by the "volume effect" during the charging and discharging of the traditional silicon-based negative electrode and the uncontrollable growth of SEI films, and the like. The negative electrode material in accordance with the present disclosure does not need pre-lithiating when used, greatly improves the reversible charging capacity of the negative electrode material, and can significantly improve the energy density of the lithium battery.

DETAILED DESCRIPTION

It should be understood that the endpoints and any values in the ranges disclosed herein are not limited to the precise range or value, but to encompass values close to those ranges or values. For ranges of values, it is possible to combine between the endpoints of each of the ranges, between the endpoints of each of the ranges and the individual points, and between the individual points to give one or more new ranges of values as if these ranges of values are specifically disclosed herein. Other than in the examples, all numerical values of parameters in this specification are to be understood as being modified in all instances by the term "about" whether or not "about" actually appears before the numerical value.

In this specification, the core-shell structure refers to an assembly structure formed by using one material (such as the carbon source and organic lithium salt in the present disclosure) to uniformly coat another material (such as the silicon source in the present disclosure) through chemical bond or other force. Preferably, the negative electrode material in core-shell structure of the present disclosure is in nano size.

In this specification, the median particle size (or $D_{50}$) refers to the particle size when the cumulative particle size distribution percentage reaches 50%. The median particle size is often used to represent the average particle size of powders. In the present disclosure, unless otherwise indicated, the median particle size of the negative electrode material may be characterized by dynamic light scattering.

In the first aspect of the present disclosure, provided is a negative electrode material which has a core-shell structure, wherein the core comprises a silicon-containing material, the shell comprises an organic lithium salt and a porous carbon film, and wherein at least part of lithium ion is intercalated in the porous carbon film.

Such arrangements can not only improve the transmission rate of lithium ion, but also significantly improve the initial coulombic efficiency of the material. Preferably, the negative electrode material in accordance with the present disclosure may further comprise a phosphorus-containing coating layer. The phosphorus-containing coating layer may be between the core and the shell. The phosphorus-containing coating layer may comprise a polymer having polycyclic aromatic hydrocarbon structural segments. In one variant, the $^{13}$C-NMR spectrum of the polymer having polycyclic aromatic hydrocarbon structural segments involves signal peaks at 110 ppm-140 ppm, indicating the presence of the polycyclic aromatic hydrocarbon structural segments. Message relating to the chemical shifts of polycyclic aromatic hydrocarbons in $^{13}$C-NMR spectrum is disclosed in: Harris, K. J., Reeve Z. E. M., et al. Electrochemical Changes in Lithium-Battery Electrodes Studied Using $^{7}$Li NMR and Enhanced $^{13}$C NMR of Graphene and Graphitic Carbons [J]. Chem. Mater. 2015, 27, 9, pp 3299-3305, which is fully incorporated herein by reference. Phosphorus in the phosphorus-containing coating layer and silicon in the silicon-containing material are connected via a chemical bond, preferably P(O)—O—Si. The connecting of phosphorus and silicon via P(O)—O—Si may be characterized by X-ray photoelectron spectroscopy or $^{29}$Si-NMR spectrum.

Preferably, the negative electrode material in accordance with the present disclosure may further comprise graphite. Although the theoretical capacity of carbon is much lower than that of silicon, the introduction of graphite into the negative electrode material can compensate the low conductivity of silicon and simultaneously greatly improve the cycle charging capacity retention. In addition, the use of graphite does not suffer from the problem of volume expansion experienced by silicon negative electrode materials during charging and discharging. There is not any special limitation on the position of graphite in the invention. Due to the difference in the processing conditions in the preparations, graphite may be present in the core, in the shell, or both.

According to a preferred embodiment of the present disclosure, graphite is present in the core and/or shell.

Preferably, the silicon-containing material is at least one selected from the group consisting of elemental silicon, SiOx wherein 0.6<x<1.5, and silicon-containing alloys. The silicon-containing materials may be commercially available or prepared by known methods.

Preferably, the silicon-containing alloy is at least one selected from the group consisting of silicon-aluminum alloy, silicon-magnesium alloy, silicon-zirconium alloy and silicon-boron alloy. The content of silicon in the silicon-containing alloys may be selected within a wide range. For example, based on the total amount of the silicon-containing alloy, silicon may be present in an amount of 10-50 wt %. There is not any special limitation on the method for preparing the silicon-containing alloy. Provided herein is a specific method for preparing a silicon-containing alloy. However, the present disclosure is not limited thereto. For example, a method for preparing a silicon-aluminum alloy may comprise the steps of: 1) ball milling aluminum powder and silicon powder for 30 min under an inert protection atmosphere; and 2) treating the mixture obtained in the above step at 900° C. for 10 hours.

Preferably, the organic lithium salt may be those salts formed from a compound containing an organic acid functional group (preferably carboxyl group) and an alkaline compound containing lithium. Preferably, the organic lithium salt may be at least one selected from the group consisting of lithium polyacrylate, lithium polymethacrylate, lithium polymaleate, lithium polyfumarate, lithium carboxymethylcellulose and lithium alginate. The molecular weight of the organic lithium salt may be selected within a wide range. Preferably, the organic lithium salt may have a weight average molecular weight of 2000-5000000, more preferably 80000-300000.

The contents of components in the negative electrode material in accordance with the present disclosure may be selected within a wide range. Preferably, based on the total amount of the negative electrode material, the organic lithium salt may be present in an amount of 5-34 wt %, the silicon-containing material may be present in an amount of 65-90 wt %, and the porous carbon film may be present in an amount of 1-10 wt %. More preferably, based on the total amount of the negative electrode material, the organic lithium salt may be present in an amount of 10-30 wt %, the silicon-containing material may be present in an amount of 68-86 wt %, and the porous carbon film may be present in an amount of 1-6 wt %.

According to a preferred embodiment of the present disclosure, the negative electrode material may further comprise graphite. Further preferably, graphite may be present in the core and/or the shell, more preferably in the shell.

The content of graphite may be selected within a wide range. Preferably, the mass ratio of the total amount of the silicon-containing material, the organic lithium salt and the porous carbon film to the amount of graphite is 1:1-10, further preferably 1:1-5.

Preferably, the negative electrode material has a median particle size of 0.1-20 μm, such as 0.1 μm, 0.5 μm, 1 μm, 10 μm, 15 μm, 20 μm, and any value in the range formed by any two of those values.

In the second aspect of the present disclosure, provided is a method for preparing a negative electrode material, comprising the steps of:
(1) mixing a silicon source and a carbon source, and then calcining the mixture;
(2) mixing the calcined product obtained in the step (1) with an organic lithium salt; and
(3) subjecting the materials obtained in the step (2) of mixing to vacuum freeze-drying.

Preferably, the silicon source may be the silicon-containing material mentioned above, or a silicon-containing precursor that can be converted into the silicon-containing material by the calcining. Further preferably, the silicon source may be the silicon-containing material mentioned above. The suitable materials may be selected as described above, which is not repeated here.

Preferably, the carbon source is pitch, preferably at least one selected from the group consisting of petroleum pitch, coal tar pitch, natural pitch and modified pitch. Such preferred arrangements are advantageous to the formation of the porous carbon and thereby can improve the electrochemical performances of the prepared negative electrode material.

The petroleum pitch, coal tar pitch, natural pitch and modified pitch have the meanings commonly understood by those skilled persons in the art and may be commercially available.

The amount of the carbon source depends on the amount of the silicon source. Preferably, the mass ratio of the silicon source to the carbon source is 1:(0.04-0.12), such as 1:0.04, 1:0.05, 1:0.06, 1:0.07, 1:0.08, 1:0.09, 1:0.10, 1:0.11, 1:0.12, and any value in the range formed by any two of those values.

Preferably, the step (1) of mixing includes: adding the silicon source and the carbon source to an organic solvent, and then stirring ultrasonically. Such preferred arrangements are advantageous to the uniform coating of the carbon source on the surface of silicon.

The time of the ultrasonically stirring may be selected within a wide range. It is judged by whether the silicon source and carbon source can be dispersed in the organic solvent.

Preferably, the time of the ultrasonically stirring is 10-100 min, further preferably 20-60 min.

The organic solvent may be an organic solvent commonly used in the art, preferably at least one selected from the group consisting of N,N-dimethylformamide, N,N-dimethylacetamide and N-methylpyrrolidone.

The amount of the organic solvent may be selected within a wide range. For example, the slurry obtained by the mixing may have a solid content of 10-35 wt %.

According to an embodiment of the present disclosure, the method may further comprise: separating the mixed material after the step (1) of mixing, and calcining the solid obtained by the separating. The separating may be operated by any conventional separation method in the art, such as centrifugal separation. Preferably, the method may further comprise: drying the solid obtained by the separating and then calcining. The conditions for the drying may be selected within a wide range. Preferably, it is operated at temperature of 80-150° C. for a time of 1-10 h.

Preferably, the calcining may be operated under an inert atmosphere at a temperature of 600-1000° C., preferably 700-900° C., for a time of 10-240 min, preferably 20-60 min. The inert atmosphere may be provided by at least one selected from the group consisting of nitrogen, helium, argon and krypton. The examples of the present disclosure use nitrogen for illustrating. However, the present disclosure is not limited thereto.

There is not any specific limitation on the heating rate during the calcining. For example, it may be 1-10° C./min. The examples of the present disclosure adopt 5° C./min for illustrating. However, the present disclosure is not limited thereto.

According to an embodiment of the present disclosure, the method may comprise: operating the step (2) after the calcined product obtained in the step (1) is cooled (preferably to 50° C. or below, such as a room temperature of 25° C.). The cooling may be natural cooling.

The suitable materials for the organic lithium salt may be selected as described above, which is not repeated here.

Preferably, in relative to 1 part by weight of the silicon source, the organic lithium salt is used in an amount of 0.05-0.5 parts by weight, preferably 0.1-0.4 parts by weight.

There is not any specific limitation on the operation for the step (2) of mixing the calcined product obtained in the step (1) with the organic lithium salt. Preferably, the step (2) of mixing may include: adding the calcined product obtained in the step (1) and the organic lithium salt into the solvent and stirring for 4-48 hours. The amount of solvent may be selected within a wide range. For example, the slurry obtained by mixing may have a solid content of 10-35 wt %. Preferably, the solvent is water.

The vacuum freeze-drying in the step (3) can hold the structure of the porous carbon obtained in the calcining in the step (1), and make at least part of lithium ion intercalated in the porous carbon film.

Theoretically, the lower the temperature and vacuum degree of vacuum freeze-drying, the better. However, as the temperature and vacuum degree decrease, the energy consumption increases. In fact, there is operation limitation for a vacuum freeze-drying equipment. Considering the energy consumption and effect, it is preferable that the vacuum freeze-drying of the step (3) is operated at a temperature of not higher than −65° C., preferably −80° C. to −65° C. and a vacuum degree of not higher than 120 Pa, preferably 90-120 Pa.

The time of the vacuum freeze-drying may be selected within a wide range. Preferably, the vacuum freeze-drying may be operated for 4-48 h, preferably 8-32 h.

Preferably, the method may further comprise: forming a phosphorus-containing coating layer before the step (1). For example, the forming may be completed by a method comprising the steps of:
 (a) contacting the silicon-containing material, a phosphorus source and a solvent at 30-80° C. to graft the phosphorus source to the surface of the silicon-containing material; and
 (b) subjecting to a temperature programmed calcining to convert the phosphorus source around the silicon-containing material into the phosphorus-containing coating layer comprising the polymer having polycyclic aromatic hydrocarbon structural segments, wherein the temperature programmed calcining comprises:
 heating to a first temperature of 400-500° C. at a first heating rate,
 heating to a second temperature of 600-800° C. at a second heating rate, wherein the second heating rate is lower than the first heating rate, and
 keeping at the second temperature.

The phosphorus source may be any phosphorus-containing precursor that can be converted into the polymer having polycyclic aromatic hydrocarbon structural segments, for example by polycondensation. The preferred phosphorus source is selected from the group consisting of organic polybasic phosphoric acid and its esters or salts. Preferably, the organic polybasic phosphoric acid is phytic acid. The preferable solvent for the step (a) may be at least one selected from the group consisting of toluene, N,N-dimethylformamide, N,N-dimethylacetamide and N-methylpyrrolidone. Preferably, the solvent may be present in such an amount that the material obtained in the step (a) has a solid content of 5-40 wt %. Preferably, the temperature programmed calcining may include: heating to a first temperature of 450-500° C., such as 480° C., at a first heating rate of 1-10° C./min, preferably 5-10° C./min; then heating to a second temperature of 600-650° C., such as 620° C., at a second heating rate of 1-5° C./min, preferably 1-3° C./min; and keeping at the second temperature for 1-8h, preferably 2-4h.

Preferably, the method may further comprise the step of adding graphite. The graphite may be added in the step (1) and/or the step (2), or be added after the step (3).

According to a preferred embodiment of the present disclosure, the method may further comprise the step of adding graphite in the step (1) and/or the step (2). In particular, the adding graphite in the step (1) may include, but not limited to: mixing the silicon source, the carbon source and graphite, and then calcining the mixture. In particular, the adding graphite in the step (2) may include, but not limited to: mixing the calcined product obtained in the step (1), the organic lithium salt and graphite.

According to another preferred embodiment of the present disclosure, the method may further comprise the step (4) of: mixing the product obtained in the vacuum freeze-drying in the step (3) with graphite.

It is preferable to add graphite in the step (4). Such preferred arrangements are advantageous to easily adjusting the reversible charging capacity of the prepared negative electrode material.

According to a preferred embodiment of the present disclosure, in relative to 1 part by weight of the product obtained in the vacuum freeze-drying in the step (3), graphite is used in an amount of 1-15 parts by weight, preferably 1-5 parts by weight.

In the third aspect of the present disclosure, provided is the negative electrode material prepared by the above method. The negative electrode material may have structure and chemical composition as described above, which is not repeated here.

In the fourth aspect of the present disclosure, provided is use of the above negative electrode material in a lithium ion battery. Compared with the traditional pure graphite negative electrode material, the above negative electrode material contains silicon having higher theoretical capacity, which significantly improves the reversible charging capacity. Therefore, when the above negative electrode material is used in a lithium ion battery, the energy density of the lithium ion battery can be improved.

In the fifth aspect of the present disclosure, provided is a lithium ion battery, comprising: the negative electrode material in accordance with the present disclosure, a lithium-containing positive electrode material, a separator and an electrolyte.

The lithium ion battery in accordance with the present disclosure has a structure well known to those skilled persons in the art. In general, the separator is disposed between the positive electrode and the negative electrode. The positive electrode contains a positive electrode material and the negative electrode contains a negative electrode material. There is not any special limitation on the chemical composition of the positive electrode material. It may be a lithium-based positive electrode material commonly used in the art.

In the lithium ion battery in accordance with the present disclosure, the separator may be selected from various separators commonly used in lithium-ion batteries, such as polypropylene microporous films, polyethylene mat, glass fiber mat or ultra-fine glass fiber paper.

In the lithium ion battery in accordance with the present disclosure, the electrolyte may be various conventional electrolytes, such as non-aqueous electrolyte. The non-aqueous electrolyte is a solution formed by an electrolyte lithium salt in a non-aqueous solvent. Any traditional non-aqueous electrolyte known to those skilled persons in the art may be used. For example, the electrolyte may be at least one selected from the group consisting of lithium hexafluorophosphate ($LiPF_6$), lithium perchlorate ($LiClO_4$), lithium tetrafluoroborate ($LiBF_4$), lithium hexafluoroarsenate ($LiAsF_6$) and lithium hexafluorosilicate ($LiSiF_6$). The non-aqueous solvents may be selected from the group consisting of linear esters and cyclic esters and mixtures thereof. The linear esters may be at least one selected from the group consisting of dimethyl carbonate (DMC), diethyl carbonate (DEC), methyl ethyl carbonate (EMC), methyl propyl carbonate (MPC) and dipropyl carbonate (DPC). The cyclic esters may be at least one selected from the group consisting of ethylene carbonate (EC), propylene carbonate (PC) and vinylene carbonate (VC).

The invention will be described in detail below through the following examples. The examples are intended to illustrate and not to limit the invention in any way.

Testing Methods
1. For Identifying Materials
1.1 Transmission Electron Microscope (TEM) Images The morphology of a sample of a negative electrode material was characterized with transmission electron microscope. Specifically, the transmission electron microscope used was JEM-2100 transmission electron microscope from Japan Electronics Co., Ltd., and the test conditions included acceleration voltage of 160 KV. The sample was placed on the copper support net and then inserted into the electron microscope for observation. A magnification of 800000 was used for observation.

1.2 Full X-Ray Photoelectron Spectroscopy Spectrum

The sample of a negative electrode material was characterized with ESCALAB 250Xi X-ray photoelectron spectroscopy tester from ThermoFisher Scientific Company of the United States. The test conditions included: room temperature of 25° C., vacuum degree of less than $5\times10^{-10}$ mba, working voltage of 15 kV, Al Kα as the ray source, a full spectrum passing energy of 100 eV and a step length of 1.0 ev.

1.3 Li-1s XPS Spectrum

The sample of a negative electrode material was characterized with ESCALAB 250Xi X-ray photoelectron spectroscopy tester from ThermoFisher Scientific Company of the United States. The test conditions included: room temperature of 25° C., vacuum degree of less than $5\times10^{-10}$ mba, working voltage of 15 kV, Al Kα as the ray source, a narrow spectrum passing energy of 30 eV, a step length of 0.05 ev and a beam spot of 500 μm.

1.4 Median Particle Size ($D_{50}$)

The median particle size is characterized by dynamic light scattering according to GB/T 19077-2016.

2. For Electrical Properties of Materials

The negative electrode materials prepared in the following examples and comparative examples were assembled into lithium ion battery samples. The electrochemical properties of the obtained lithium ion battery samples were tested with Wuhan blue battery test system (CT2001B). The test conditions included voltage range of 0.005V-3V. Each negative electrode material was assembled into 10 samples in a form of coin cell. The battery performances of the samples were tested under the same voltage and current. The average value thereof was used as the measured value.

2.1 the Profile of the First Charging and Discharging

At a voltage range of 0.05V-3V and a current rate of 0.1 C, the assembled lithium ion battery samples were subjected to the first charging and discharging, and the profile of the first charging and discharging was obtained. The battery test system (CT2001B) gave the first discharge capacity and the first charge capacity of the tested battery sample. The first discharge capacity was the specific capacity of the negative electrode material, and the first charge capacity was the reversible charging capacity of the negative electrode material. The initial coulombic efficiency (also referred to as "ICE") could be calculated from them:

ICE=the reversible charging capacity of the negative electrode material/the specific capacity of the negative electrode material.

2.2 Cycle Stability Test

At a current rate of 0.2 C, the assembled lithium ion battery sample was subjected to charging and discharging for selected cycles, such as 20, 50 or 100 cycles. The reversible charging capacity of the sample at each cycle was measured. The cycle charging capacity retention of each cycle was calculated according to the following:

The cycle charging capacity retention=the reversible charging capacity at the selected cycle/the reversible charging capacity at the first charging×100%

The profile of the cycle stability was plotted by taking the cycle numbers as the X-axis and the cycle charging capacity retention as the Y-axis.

3. Reagents

In the following examples and comparative examples, the petroleum pitch used was purchased from TIPCO Company with the brand of PMA. The coal tar pitch was purchased from Longxin material Trade Co., Ltd. with the brand of low-temperature pitch (100-115).

Lithium polyacrylate was prepared. In particular, 10 g of polyacrylic acid with a weight average molecular weight of 240000 was added to 40 g deionized water to prepare a polyacrylic acid solution with a concentration of 20 mass %. To the polyacrylic acid solution, 3.4 g lithium hydroxide was added. The mixture was heated at 40° C. under stirring until all solids were dissolved, and then dried at 100° C. for 4h to obtain lithium polyacrylate.

Lithium polymethacrylate was prepared. In particular, 10 g of polymethacrylic acid with a weight average molecular weight of 240000 was added to 40 g deionized water to prepare a polymethacrylic acid solution with a concentration of 20 mass %. To the polymethacrylic acid solution, 3.4 g lithium hydroxide was added. The mixture was heated at 40° C. under stirring until all solids were dissolved, and then dried at 100° C. for 4h to obtain lithium polymethacrylate.

Lithium polymaleate was prepared. In particular, 10 g of polymaleic acid with a weight average molecular weight of 240000 was added to 40 g deionized water to prepare a polymaleic acid solution with a concentration of 20 mass %. To the polymaleic acid solution, 3.4 g lithium hydroxide was added. The mixture was heated at 40° C. under stirring until all solids were dissolved, and then dried at 100° C. for 4h to obtain lithium polymaleate.

Lithium polyfumarate was prepared. In particular, 10 g of polyfumaric acid with a weight average molecular weight of 240000 was added to 40 g deionized water to prepare a polyfumaric acid solution with a concentration of 20 mass %. To the polyfumaric acid solution, 3.4 g lithium hydroxide was added. The mixture was heated at 40° C. under stirring until all solids were dissolved, and then dried at 100° C. for 4h to obtain lithium polyfumarate.

Lithium carboxymethyl cellulose was prepared. In particular, 10 g of sodium carboxymethyl cellulose with a weight average molecular weight of 120000 was added to 40 g deionized water to prepare a sodium carboxymethyl cellulose solution with a concentration of 20 mass %. To the sodium carboxymethyl cellulose solution, 3.1 g lithium hydroxide was added. The mixture was heated at 40° C. under stirring until all solids were dissolved, and then dried at 100° C. for 4h to obtain lithium carboxymethyl cellulose.

Lithium alginate was prepared. In particular, 10 g of sodium alginate with a weight average molecular weight of 80000 was added to 40 g deionized water to prepare a sodium alginate solution with a concentration of 20 mass %. To the sodium alginate solution, 1.2 g lithium hydroxide was added. The mixture was heated at 40° C. under stirring until all solids were dissolved, and then dried at 100° C. for 4h to obtain lithium alginate.

Polyacrylic acid, polymethacrylic acid, polymaleic acid, polyfumaric acid, sodium carboxymethylcellulose and sodium alginate used were purchased from Aladdin reagent company.

In the following examples and comparative examples, the room temperature was referred to 25° C.

Example 1

(1) 1 g of silicon powder with $D_{50}$ of 120 nm and 0.12 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon material obtained in the step (2) was treated in a tubular furnace by heating to 800° C. at a rate of 5° C./min and keeping under nitrogen atmosphere for 30 minutes. After cooling naturally to the room temperature, obtained was a carbon coated silicon material.

(4) 0.125 g of lithium polyacrylate and the carbon coated silicon material obtained in the step (3) were added into 3 mL deionized water and stirred at the room temperature for 12h. Then, the obtained slurry after stirring was placed in a freeze vacuum drying oven with a cold trap temperature of −80° C. and a cavity vacuum of 100 Pa to be dried for 12 hours. Obtained was the lithium-containing negative electrode material S-1. The median particle size and the content of each component of the lithium-containing negative electrode material S-1 were listed in Table 1.

Figure 1:
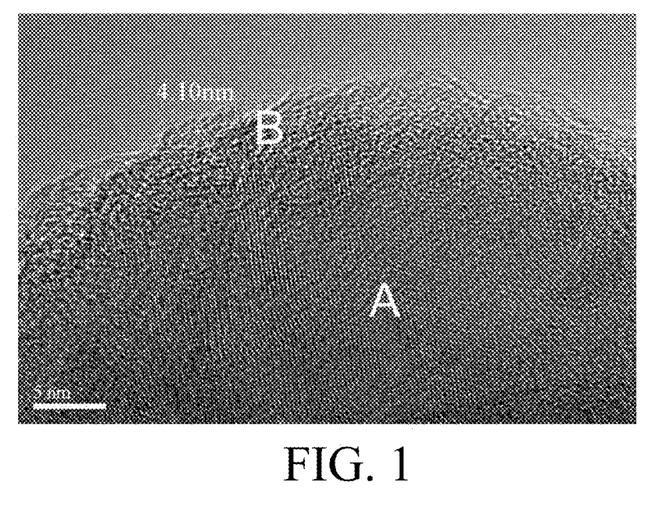
FIG. 1 shows a TEM image of the negative electrode material S-1 prepared in example 1, wherein A is a core of nano silicon and B is a shell.
Figure 2:
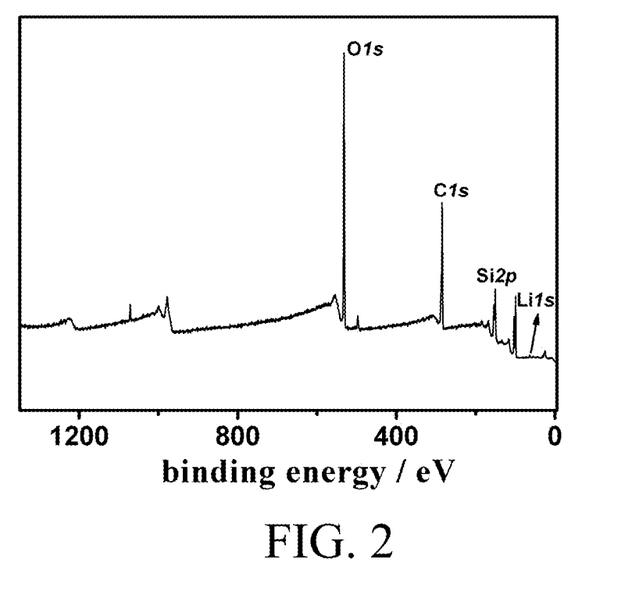
FIG. 2 shows a full X-ray photoelectron spectroscopy (XPS) spectrum of the negative electrode material S-1 prepared in example 1.
Figure 3:
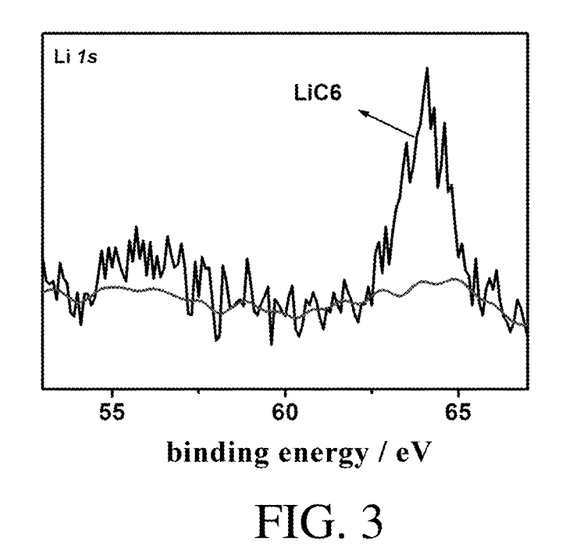
FIG. 3 shows a Li-1s XPS spectrum of the negative electrode material S-1 prepared in example 1.

The lithium-containing negative electrode material S-1 was sampled and subjected to the test for identifying material as described above. FIG. 1 was a TEM image of the lithium-containing negative electrode material S-1. As could be seen from the figure, silicon nanoparticles were uniformly coated to form a core-shell structure, wherein the outer surface of the core was covered with a porous carbon film. FIG. 2 was a full XPS spectrum of the lithium-containing negative electrode material S-1. As could be seen from the spectrum, the negative electrode material contained elements of lithium, carbon and silicon. FIG. 3 was the Li-1s XPS spectrum of the lithium-containing negative electrode material S-1. As shown in FIG. 3, a significant signal peak appeared at the binding energy of 64.1 eV. This signal peak corresponded to a complex of $LiC_6$. The formation of the complex $LiC_6$ indicated that Li ions migrated into the porous carbon film and were between layers of carbon atoms. That is, lithium ions were intercalated in the porous carbon film.

A CR2016 coin cell was assembled by using the lithium-containing negative electrode material S-1 obtained in example 1 and a metal lithium sheet as positive electrode and negative electrode respectively, 1 mol/L $LiPF_6$ solution as electrolyte (wherein a mixture of vinyl carbonate and diethyl carbonate in a ratio of 3:7 by volume was used as solvents) and a polypropylene microporous film as separator. The battery was subjected to the tests for detecting electrical properties as described above, to characterize the electrical properties of the lithium-containing negative electrode material S-1 of example 1.

Figure 4:
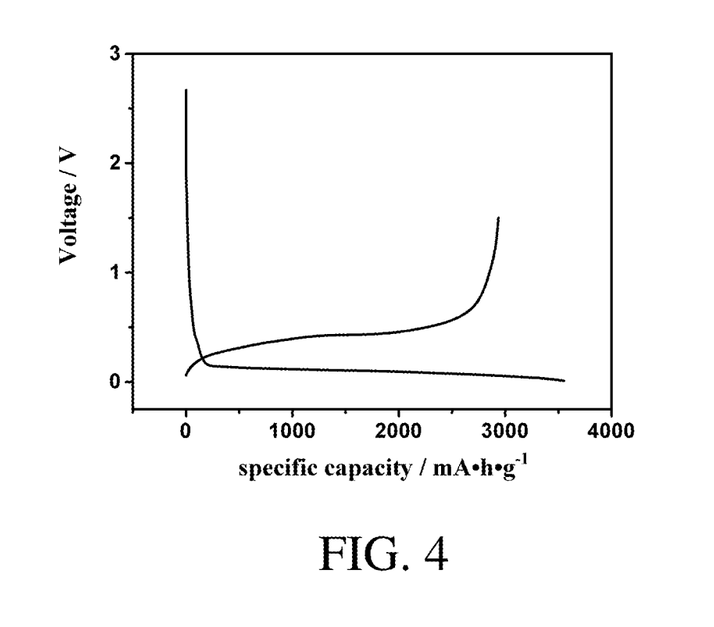
FIG. 4 shows the profile of the first charging and discharging of the negative electrode material S-1 prepared in example 1.

FIG. 4 was the profile of the first charging and discharging of the coin cell which was based on the lithium-containing negative electrode material S-1 of example 1. As shown in the figure, the lithium-containing negative electrode material S-1 of example 1 had a reversible charging capacity of 3000 mAh/g and an ICE of 86.9%.

Figure 5:
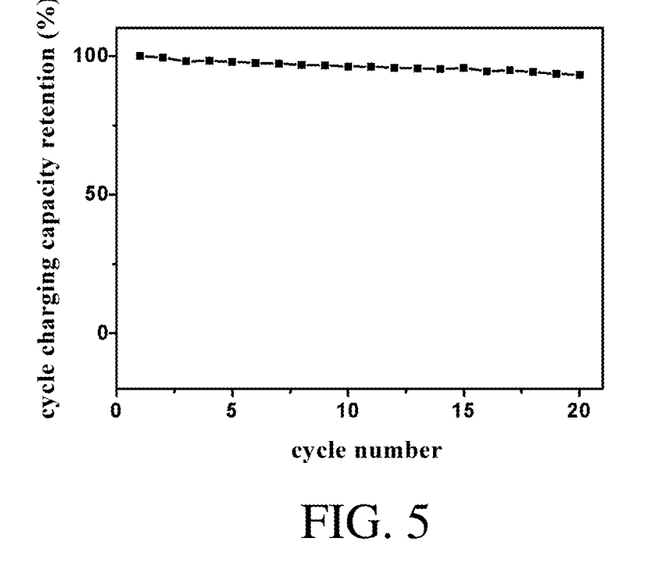
FIG. 5 shows the profile of the cycle stability of the negative electrode material S-1 prepared in example 1.

FIG. 5 was the profile of the cycle stability of the coin cell which was based on the lithium-containing negative electrode material S-1 of example 1. As shown in the figure, the lithium-containing negative electrode material S-1 of example 1 had a charging capacity retention of about 92% after 20 charging and discharging cycles at a current rate of 0.2 C.

Comparative Example 1

(1) 1 g of silicon powder with $D_{50}$ of 120 nm and 0.12 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon material obtained in the step (2) was treated in a tubular furnace by heating to 800° C. at a rate of 5° C./min and keeping under nitrogen atmosphere for 30 minutes. After cooling naturally to room temperature, obtained was a carbon coated silicon material, which was regarded as the negative electrode material D-1.

A coin cell was prepared and subjected to the tests for electrical properties as outlined in example 1 except that the lithium-containing negative electrode material S-1 was replaced with the negative electrode material D-1 obtained in comparative example 1.

Figure 6:
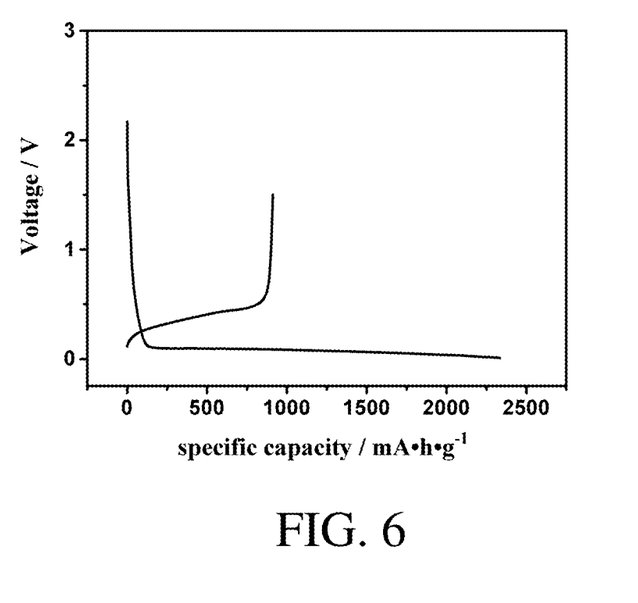
FIG. 6 shows the profile of the first charging and discharging of the negative electrode material D-1 prepared in comparative example 1.

FIG. 6 was the profile of the first charging and discharging of the coin cell which was based on the negative electrode material D-1 of comparative example 1. As shown in the figure, the negative electrode material D-1 of comparative example 1 had a reversible charging capacity of 908 mAh/g and an ICE of 38.9%.

Figure 7:
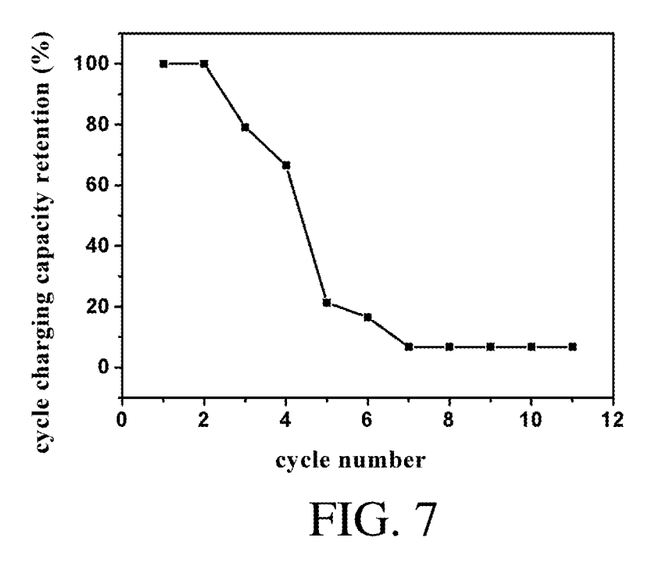
FIG. 7 shows the profile of the cycle stability of the negative electrode material D-1 prepared in comparative example 1.

FIG. 7 was the profile of the cycle stability of the coin cell which was based on the negative electrode material of comparative example 1. As shown in the figure, the negative electrode material of comparative example 1 had a charging capacity retention of 6% after 12 charging and discharging cycles at a current rate of 0.2 C.

Comparative Example 2

Example 1 was repeated except that the obtained slurry after ultrasonically stirring was dried in air (at a temperature of 100° C.) for 12h. Obtained was the lithium-containing negative electrode material D-2.

Figure 8:
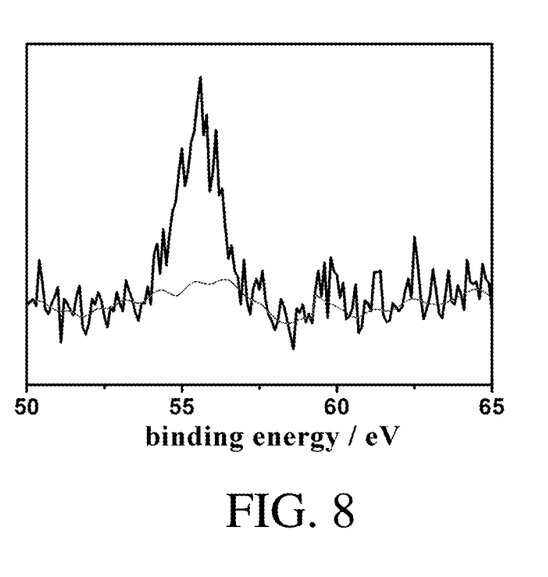
FIG. 8 shows a Li-1s XPS spectrum of the negative electrode material D-2 prepared in comparative example 2.

The lithium-containing negative electrode material D-2 was sampled and subjected to the test for identifying material as described above. FIG. 8 was the Li-1s XPS spectrum of the lithium-containing negative electrode material D-2. As shown in FIG. 8, a signal peak appeared at the binding energy of 56.3 eV. It was attributable to the signal peak for the organic lithium salt (i.e. lithium polyacrylate). There was not the significant signal peak at the binding energy of 64.1 eV, which was corresponding to the complex of $LiC_6$. It indicated that no intercalation of lithium ions in the porous carbon film occurred.

A coin cell was prepared and subjected to the tests for electrical properties as outlined in example 1 except that the lithium-containing negative electrode material S-1 was replaced with the material obtained in comparative example 2. The test results showed that, the material of comparative example 2 had a reversible charging capacity of 795 mAh/g and an ICE of 36.3%. The material had a charging capacity retention of about 30% after 20 charging and discharging cycles at a current rate of 0.2 C.

Comparative Example 3

Example 1 was repeated except that lithium polyacrylate was replaced with lithium carbonate in the same amount. Obtained was the lithium-containing negative electrode material D-3.

A coin cell was prepared and subjected to the tests for electrical properties as outlined in example 1 except that the lithium-containing negative electrode material S-1 was replaced with the material obtained in comparative example 3. The test results showed that, the material of comparative example 3 had a reversible charging capacity of 820 mAh/g and an ICE of 31%. The material had a charging capacity retention of about 10% after 10 charging and discharging cycles at a current rate of 0.2 C.

Example 2

(1) 1 g of silicon powder with $D_{50}$ of 120 nm and 0.04 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon material obtained in the step (2) was treated in a tubular furnace by heating to 800° C. at a rate of 5° C./min and keeping under nitrogen atmosphere for 30 minutes. After cooling naturally to room temperature, obtained was a carbon coated silicon material.

(4) 0.15 g of lithium polyacrylate and the carbon coated silicon material obtained in the step (3) were added into 3 mL deionized water and stirred at room temperature for 12 h. Then, the obtained slurry after stirring was placed in a freeze vacuum drying oven with a cold trap temperature of −80° C. and a cavity vacuum of 100 Pa to be dried for 12 hours. Obtained was the lithium-containing negative electrode material S-2. The median particle size and the content of each component of the lithium-containing negative electrode material S-2 were listed in Table 1.

The lithium-containing negative electrode material S-2 had a TEM image, a full XPS spectrum and a Li-1s XPS spectrum that were similar to FIG. 1 to FIG. 3 respectively. It indicated that the obtained lithium-containing negative electrode material S-2 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 2. The test results showed that, the material of example 2 had a reversible charging capacity of 2812 mAh/g and an ICE of 87.6%. The material had a charging capacity retention of about 90% after 15 charging and discharging cycles at a current rate of 0.2 C.

Example 3

(1) 1 g of silicon powder with $D_{50}$ of 120 nm and 0.08 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon material obtained in the step (2) was treated in a tubular furnace by heating to 700° C. at a rate of 5° C./min and keeping under nitrogen atmosphere for 30 minutes. After cooling naturally to room temperature, obtained was a carbon coated silicon material.

(4) 0.3 g of lithium polyacrylate and the carbon coated silicon material obtained in the step (3) were added into 3 mL deionized water and stirred at room temperature for 12 h. Then, the obtained slurry after stirring was placed in a freeze vacuum drying oven with a cold trap temperature of −80° C. and a cavity vacuum of 100 Pa to be dried for 12 hours. Obtained was the lithium-containing negative electrode material S-3. The median particle size and the content of each component of the lithium-containing negative electrode material S-3 were listed in Table 1.

The lithium-containing negative electrode material S-3 had a TEM image, a full XPS spectrum and a Li-1s XPS spectrum that were similar to FIG. 1 to FIG. 3 respectively. It indicated that the obtained lithium-containing negative electrode material S-3 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 3. The test results showed that, the material of example 3 had a reversible charging capacity of 2760 mAh/g and an ICE of 89.3%. The material had a charging capacity retention of about 85% after 15 charging and discharging cycles at a current rate of 0.2 C.

Example 4

(1) 1 g of silicon powder with $D_{50}$ of 300 nm and 0.08 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon material obtained in the step (2) was treated in a tubular furnace by heating to 900° C. at a rate of 5° C./min and keeping under nitrogen atmosphere for 30 minutes. After cooling naturally to room temperature, obtained was a carbon coated silicon material.

(4) 0.32 g of lithium alginate and the carbon coated silicon material obtained in the step (3) were added into 3 mL deionized water and stirred at room temperature for 12 h. Then, the obtained slurry after stirring was placed in a freeze vacuum drying oven with a cold trap temperature of −80° C. and a cavity vacuum of 100 Pa to be dried for 12 hours. Obtained was the lithium-containing negative electrode material S-4. The median particle size and the content of each component of the lithium-containing negative electrode material S-4 were listed in Table 1.

The lithium-containing negative electrode material S-4 had a TEM image, a full XPS spectrum and a Li-1s XPS spectrum that were similar to FIG. 1 to FIG. 3 respectively. It indicated that the obtained lithium-containing negative electrode material S-4 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 4. The test results showed that, the material of example 4 had a reversible charging capacity of 2720 mAh/g and an ICE of 87.9%. The material had a charging capacity retention of about 85% after 15 charging and discharging cycles at a current rate of 0.2 C.

Example 5

(1) 1 g of silicon powder with $D_{50}$ of 300 nm and 0.08 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon material obtained in the step (2) was treated in a tubular furnace by heating to 800° C. at a rate of 5° C./min and keeping under nitrogen atmosphere for 30 minutes. After cooling naturally to room temperature, obtained was a carbon coated silicon material.

(4) 0.42 g of lithium carboxymethylcellulose and the carbon coated silicon material obtained in the step (3) were added into 3 mL deionized water and stirred at room temperature for 12 h. Then, the obtained slurry after stirring was placed in a freeze vacuum drying oven with a cold trap temperature of −80° C. and a cavity vacuum of 100 Pa to be dried for 12 hours. Obtained was the lithium-containing negative electrode material S-5. The median particle size and the content of each component of the lithium-containing negative electrode material S-5 were listed in Table 1.

The lithium-containing negative electrode material S-5 had a TEM image, a full XPS spectrum and a Li-1s XPS spectrum that were similar to FIG. 1 to FIG. 3 respectively. It indicated that the obtained lithium-containing negative electrode material S-5 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 5. The test results showed that, the material of example 5 had a reversible charging capacity of 2870 mAh/g and an ICE of 86.1%. The material had a charging capacity retention of about 91% after 18 charging and discharging cycles at a current rate of 0.2 C.

Example 6

(1) 1 g of silicon powder with $D_{50}$ of 120 nm and 0.08 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon material obtained in the step (2) was treated in a tubular furnace by heating to 800° C. at a rate of 5° C./min and keeping under nitrogen atmosphere for 30 minutes. After cooling naturally to room temperature, obtained was a carbon coated silicon material.

(4) 0.15 g of lithium polyacrylate and the carbon coated silicon material obtained in the step (3) were added into 3 mL deionized water and stirred at room temperature for 12 h. Then, the obtained slurry after stirring was placed in a freeze vacuum drying oven with a cold trap temperature of −80° C. and a cavity vacuum of 100 Pa to be dried for 12 hours.

(5) The product obtained after the drying in the step (4) was blended with artificial graphite in a mass ratio of 1:4. Obtained was the lithium-containing negative electrode material S-6 having a designed capacity of 900 mAH/g. The median particle size and the content of each component of the lithium-containing negative electrode material S-6 were listed in Table 1.

The lithium-containing negative electrode material S-6 had a TEM image, a full XPS spectrum and a Li-1s XPS spectrum that were similar to FIG. 1 to FIG. 3 respectively. It indicated that the obtained lithium-containing negative electrode material S-6 had a core-shell structure, wherein the outer surface of the core was coated with a porous carbon film and graphite, and lithium ions were intercalated in the porous carbon film.

A coin cell was prepared and subjected to the tests for electrical properties as outlined in example 1 except that the lithium-containing negative electrode material S-1 was replaced with the material obtained in example 6. The test results showed that, the material of example 6 had a reversible charging capacity of 912 mAh/g and an ICE of 90.6%. The material had a charging capacity retention of about 96% after 100 charging and discharging cycles at a current rate of 0.2 C.

Example 7

(1) 1 g of silicon powder with $D_{50}$ of 120 nm and 0.08 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon material obtained in the step (2) was treated in a tubular furnace by heating to 800° C. at a rate of 5° C./min and keeping under nitrogen atmosphere for 30 minutes. After cooling naturally to room temperature, obtained was a carbon coated silicon material.

(4) 0.15 g of lithium polyacrylate and the carbon coated silicon material obtained in the step (3) were added into 3 mL deionized water and stirred at room temperature for 12 h. Then, the obtained slurry after stirring was placed in a freeze vacuum drying oven with a cold trap temperature of −80° C. and a cavity vacuum of 100 Pa to be dried for 12 hours.

(5) The product obtained after the drying in the step (4) was blended with artificial graphite in a mass ratio of 1:5. Obtained was the lithium-containing negative electrode material S-7 having a designed capacity of 700 mAH/g. The median particle size and the content of each component of the lithium-containing negative electrode material S-7 were listed in Table 1.

The lithium-containing negative electrode material S-7 had a TEM image, a full XPS spectrum and a Li-1s XPS spectrum that were similar to FIG. 1 to FIG. 3 respectively. It indicated that the obtained lithium-containing negative electrode material S-7 had a core-shell structure, wherein the outer surface of the core was coated with a porous carbon film and graphite, and lithium ions were intercalated in the porous carbon film.

A coin cell was prepared and subjected to the tests for electrical properties as outlined in example 1 except that the lithium-containing negative electrode material S-1 was replaced with the material obtained in example 7. The test results showed that, the material of example 7 had a reversible charging capacity of 752 mAh/g and an ICE of 91.2%. The material had a charging capacity retention of about 96% after 150 charging and discharging cycles at a current rate of 0.2 C.

Example 8

(1) 1 g of silicon powder with $D_{50}$ of 120 nm and 0.08 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon material obtained in the step (2) was treated in a tubular furnace by heating to 800° C. at a rate of 5° C./min and keeping under nitrogen atmosphere for 30 minutes. After cooling naturally to room temperature, obtained was a carbon coated silicon material.

(4) 0.15 g of lithium polyacrylate and the carbon coated silicon material obtained in the step (3) were added into 3 mL deionized water and stirred at room temperature for 12 h. Then, the obtained slurry after stirring was placed in a freeze vacuum drying oven with a cold trap temperature of −80° C. and a cavity vacuum of 100 Pa to be dried for 12 hours.

(5) The product obtained after the drying in the step (4) was blended with artificial graphite in a mass ratio of 1:1. Obtained was the lithium-containing negative electrode material S-8 having a designed capacity of 1500 mAH/g. The median particle size and the content of each component of the lithium-containing negative electrode material S-8 were listed in Table 1.

The lithium-containing negative electrode material S-8 had a TEM image, a full XPS spectrum and a Li-1s XPS spectrum that were similar to FIG. 1 to FIG. 3 respectively. It indicated that the obtained lithium-containing negative electrode material S-8 had a core-shell structure, wherein the outer surface of the core was coated with a porous carbon film and graphite, and lithium ions were intercalated in the porous carbon film.

A coin cell was prepared and subjected to the tests for electrical properties as outlined in example 1 except that the lithium-containing negative electrode material S-1 was replaced with the material obtained in example 8. The test results showed that, the material of example 8 had a reversible charging capacity of 1512 mAh/g and an ICE of 88.9%. The material had a charging capacity retention of about 90% after 150 charging and discharging cycles at a current rate of 0.2 C.

Example 9

(1) 1 g of silicon monoxide (SiOx, x=1) powder with $D_{50}$ of 120 nm and 0.08 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon monoxide obtained in the step (2) was treated in a tubular furnace by heating to 750° C. at a rate of 5° C./min and keeping under nitrogen atmosphere for 30 minutes. After cooling naturally to room temperature, obtained was a carbon coated silicon monoxide.

(4) 0.15 g of lithium polyacrylate and the carbon coated silicon monoxide obtained in the step (3) were added into 3 mL deionized water and stirred at room temperature for 12 h. Then, the obtained slurry after stirring was placed in a freeze vacuum drying oven with a cold trap temperature of −80° C. and a cavity vacuum of 100 Pa to be dried for 12 hours. Obtained was the lithium-containing silicon monoxide-based negative electrode material of S-9. The median particle size and the content of each component of the lithium-containing silicon monoxide-based negative electrode material of S-9 were listed in Table 1.

The lithium-containing silicon monoxide-based negative electrode material of S-9 had a TEM image, a full XPS spectrum and a Li-1s XPS spectrum that were similar to FIG. 1 to FIG. 3 respectively. It indicated that the obtained lithium-containing silicon monoxide-based negative electrode material of S-9 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 9. The test results showed that, the material of example 9 had a reversible charging capacity of 1632 mAh/g and an ICE of 83.1%. The material had a charging capacity retention of about 90% after 200 charging and discharging cycles at a current rate of 0.2 C.

Example 10

(1) Aluminum powder with $D_{50}$ of 100 nm and silicon powder with $D_{50}$ of 120 nm in the mass ratio of 4:1 were ball milled for 30 min under nitrogen protection atmosphere. The obtained mixture was calcined in nitrogen tubular furnace at 900° C. for 10h. Obtained was silicon-aluminum alloy powder (with $D_{50}$ of 200 nm and silicon content of 20 wt %). 1 g of the silicon-aluminum alloy powder and 0.08 g of petroleum pitch were added to 10 g of N,N-dimethylformamide, and ultrasonically stirred for 40 minutes.

(2) The slurry obtained after ultrasonically stirring was transferred to a 50 mL centrifuge tube and centrifuged at 5000 rpm for 5 minutes. The lower solids were collected and dried (at 100° C. for 4h).

(3) The pitch coated silicon-aluminum alloy obtained in the step (2) was treated in a tubular furnace by heating to 750° C. at a rate of 5° C./min and keeping under nitrogen atmosphere for 30 minutes. After cooling naturally to room temperature, obtained was a carbon coated silicon-aluminum alloy.

(4) 0.15 g of lithium polyacrylate and the carbon coated silicon-aluminum alloy obtained in the step (3) were added into 3 mL deionized water and stirred at room temperature for 12h. Then, the obtained slurry after stirring was placed in a freeze vacuum drying oven with a cold trap temperature of −80° C. and a cavity vacuum of 100 Pa to be dried for 12 hours. Obtained was the lithium-containing silicon-aluminum-based negative electrode material 5-10. The median particle size and the content of each component of the lithium-containing silicon-aluminum-based negative electrode material 5-10 were listed in Table 1.

The lithium-containing silicon-aluminum-based negative electrode material 5-10 had a TEM image, a full XPS spectrum and a Li-1s XPS spectrum that were similar to FIG. 1 to FIG. 3 respectively. It indicated that the obtained lithium-containing silicon-aluminum-based negative electrode material S-10 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 10. The test results showed that, the material of example 10 had a reversible charging capacity of 721 mAh/g and an ICE of 84.1%. The material had a charging capacity retention of about 90% after 200 charging and discharging cycles at a current rate of 0.2 C.

Example 11

Example 1 was repeated except that petroleum pitch was replaced with coat tar pitch in the same amount. Obtained was the lithium-containing negative electrode material S-11. The median particle size and the content of each component of the lithium-containing negative electrode material S-11 were listed in Table 1.

The lithium-containing negative electrode material S-11 had a TEM image, a full XPS spectrum and a Li-1s XPS spectrum that were similar to FIG. 1 to FIG. 3 respectively. It indicated that the obtained lithium-containing negative electrode material S-11 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 11. The test results showed that, the material of example 11 had a reversible charging capacity of 2932 mAh/g and an ICE of 88.7%. The material had a charging capacity retention of about 85% after 30 charging and discharging cycles at a current rate of 0.2 C.

Example 12

Example 1 was repeated except that lithium polyacrylate was replaced with lithium polymethacrylate in the same amount. Obtained was the lithium-containing negative electrode material 5-12. The median particle size and the content of each component of the lithium-containing negative electrode material 5-12 were listed in Table 1.

The lithium-containing negative electrode material 5-12 had a TEM image, a full XPS spectrum and a Li-1s XPS spectrum that were similar to FIG. 1 to FIG. 3 respectively. It indicated that the obtained lithium-containing negative electrode material 5-12 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 12. The test results showed that, the material of example 12 had a reversible charging capacity of 2895 mAh/g and an ICE of 87.1%. The material had a charging capacity retention of about 85% after 30 charging and discharging cycles at a current rate of 0.2 C.

Example 13

Example 1 was repeated except that lithium polyacrylate was replaced with lithium polymaleate in the same amount. Obtained was the lithium-containing negative electrode material S-13. The median particle size and the content of each component of the lithium-containing negative electrode material S-13 were listed in Table 1.

The lithium-containing negative electrode material S-13 had a TEM image, a full XPS spectrum and a Li-1s XPS spectrum that were similar to FIG. 1 to FIG. 3 respectively. It indicated that the obtained lithium-containing negative electrode material S-13 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 13. The test results showed that, the material of example 13 had a reversible charging capacity of 2925 mAh/g and an ICE of 86.8%. The material had a charging capacity retention of about 85% after 30 charging and discharging cycles at a current rate of 0.2 C.

Example 14

Example 1 was repeated except that lithium polyacrylate was replaced with lithium polyfumarate in the same amount. Obtained was the lithium-containing negative electrode material 5-14. The median particle size and the content of each component of the lithium-containing negative electrode material 5-14 were listed in Table 1.

The lithium-containing negative electrode material 5-14 had a TEM image, a full XPS spectrum and a Li-1s XPS spectrum that were similar to FIG. 1 to FIG. 3 respectively. It indicated that the obtained lithium-containing negative electrode material 5-14 had a core-shell structure, wherein the outer surface of the core was coated with a porous carbon film, and lithium ions were intercalated in the porous carbon film.

A coin cell was prepared and subjected to the tests for electrical properties as outlined in example 1 except that the lithium-containing negative electrode material S-1 was replaced with the material obtained in example 14. The test results showed that, the material of example 14 had a reversible charging capacity of 2963 mAh/g and an ICE of 86.5%. The material had a charging capacity retention of about 85% after 30 charging and discharging cycles at a current rate of 0.2 C.

Example 15

1) 10 g N,N-dimethylformamide and 0.272 g phytic acid were mixed to form a solution. 0.54 g silicon powder ($D_{50}$=100 nm) was added to the solution. The mixture was heated to 40° C. under stirring and kept for 60 minutes. After the reaction, the solid powder was vacuum filtered, washed, and dried under vacuum at 80° C. for 4h.

2) The solid was treated in a tubular furnace by heating to 480° C. at the first heating rate of 5° C./min, then heated to 620° C. at the second heating rate of 2° C./min, and kept at 620° C. for 3 hours. After cooling to room temperature, obtained was the product, named as the phosphorus-coated silicon-containing material S-15-1.

3) 1.5 g of the phosphorus-coated silicon-containing material 5-15-1 and 0.18 g of petroleum pitch were added to 15 g of N,N-dimethylformamide, and ultrasonically stirred for 60 minutes. The slurry obtained after ultrasonically stirring was transferred to a centrifuge tube and centrifuged at 5000 rpm for 5 minutes. The lower solids were collected and dried at 100° C. for 4h to obtain pitch-coated 5-15-1.

4) The pitch-coated 5-15-1 was treated in a tubular furnace by heating to 800° C. at a rate of 5° C./min and keeping under nitrogen atmosphere for 30 minutes. After cooling naturally to room temperature, obtained was a carbon-coated 5-15-1.

5) 0.188 g of lithium polyacrylate and the carbon-coated 5-15-1 were added into 5 mL deionized water and stirred at room temperature for 12 h. Then, the obtained slurry was placed in a freeze vacuum drying oven with a cold trap temperature of −80° C. and a cavity vacuum of 100 Pa to be dried for 12 hours. Obtained was the negative electrode material 5-15.

A coin cell was prepared and subjected to the tests for electrical properties as outlined in example 1 except that the lithium-containing negative electrode material S-1 was replaced with the material 5-15 obtained in example 15. The test results showed that, the material of example 15 had a reversible charging capacity of 3480 mAh/g and an ICE of 91.2%. The material had a charging capacity retention of 94.8% after 30 charging and discharging cycles at a current rate of 0.2 C.

TABLE 1

| Example No. | silicon-containing material, wt % | organic lithium salt, wt % | porous carbon film, wt % | graphite, wt % | median particle size, μm |
|---|---|---|---|---|---|
| Example 1 | 84.39 | 10.55 | 5.06 | 0 | 0.32 |
| Comparative example 1 | 94.34 | 0 | 5.66 | 0 | 0.28 |
| Comparative example 2 | 84.39 | 10.59 | 5.02 | 0 | 0.32 |
| Comparative example 3 | 84.39 | 10.65 | 4.96 | 0 | 0.46 |
| Example 2 | 85.47 | 12.83 | 1.70 | 0 | 0.32 |
| Example 3 | 74.61 | 22.44 | 2.95 | 0 | 0.75 |
| Example 4 | 73.53 | 23.53 | 2.94 | 0 | 2.3 |
| Example 5 | 68.50 | 28.77 | 2.73 | 0 | 5.7 |
| Example 6 | 84.03 | 12.61 | 3.36 | 80 | 10.8 |
| Example 7 | 84.02 | 12.69 | 3.29 | 83.3 | 13.5 |
| Example 8 | 84.07 | 12.64 | 3.29 | 50 | 7.3 |
| Example 9 | 84.04 | 12.60 | 3.27 | 0 | 0.42 |
| Example 10 | 84.14 | 12.61 | 3.25 | 0 | 0.65 |
| Example 11 | 84.49 | 10.6 | 4.91 | 0 | 0.48 |
| Example 12 | 84.49 | 10.57 | 4.95 | 0 | 0.52 |
| Example 13 | 84.49 | 10.62 | 5.03 | 0 | 0.42 |
| Example 14 | 84.49 | 10.51 | 5.05 | 0 | 0.45 |
| Example 15 | 84.39 | 10.55 | 5.06 | 0 | 0.38 |

It could be seen from the above examples and results that, the negative electrode materials according to the present disclosure had improved reversible charging capacity. When used in a lithium ion battery, it could improve the energy density of the lithium battery. More important, the negative electrode material of the present disclosure is simultaneously provided with improved initial coulombic efficiency and cycle charging capacity retention, especially cycle charging capacity retention in prolonged term.

The preferred embodiments of invention have been described in detail above. However, the present invention is not limited thereto. Various simple modifications may be made to the embodiments of invention within the technical scope of the present invention, including the combinations of various technical features in any other suitable way. Those simple modifications and combinations should also be regarded as the contents disclosed herein and being within the protection scope of the present disclosure.

The invention claimed is:

1. A negative electrode material having a core-shell structure,
   wherein a core of the negative electrode material comprises a silicon-containing material, a shell of the negative electrode material comprises an organic lithium salt and a porous carbon film, and at least part of lithium ion in the organic lithium salt is intercalated in the porous carbon film, and,
   based on the total amount of the negative electrode material, the organic lithium salt is present in an amount of 5-34 wt %, the silicon-containing material is present in an amount of 65-90 wt %, and the porous carbon film is present in an amount of 1-10 wt %.

2. The negative electrode material of claim 1, wherein the negative electrode material further comprises a phosphorus-containing coating layer disposed between the core and the shell.

3. The negative electrode material of claim 1, wherein,
   based on the total amount of the negative electrode material, the organic lithium salt is present in an amount of 10-30 wt %, the silicon-containing material is present in an amount of 68-86 wt %, and the porous carbon film is present in an amount of 1-6 wt %.

4. The negative electrode material of claim 1, wherein the negative electrode material has a median particle size of 0.1-20 μm.

5. The negative electrode material of claim 1, wherein the organic lithium salt is at least one selected from the group consisting of lithium polyacrylate, lithium polymethacrylate, lithium polymaleate, lithium polyfumarate, lithium carboxymethylcellulose, and lithium alginate;
   the silicon-containing material is at least one selected from the group consisting of elemental silicon, a SiOx wherein 0.6<x<1.5, and a silicon-containing alloy, the silicon-containing alloy being at least one selected from the group consisting of silicon-aluminum alloy, silicon-magnesium alloy, silicon-zirconium alloy, and silicon-boron alloy.

6. A method for preparing a negative electrode material, comprising:
   (1) mixing a silicon source and a carbon source, and then calcining the mixture;
   (2) mixing the calcined product obtained in the step (1) with an organic lithium salt; and
   (3) subjecting the materials obtained in the step (2) of mixing to vacuum freeze-drying.

7. The method of claim 6, wherein the silicon source is at least one selected from the group consisting of elemental silicon, a SiOx wherein 0.6<x<1.5, and a silicon-containing alloy, wherein the silicon-containing alloy is at least one selected from the group consisting of silicon-aluminum alloy, silicon-magnesium alloy, silicon-zirconium alloy, and silicon-boron alloy;
   the carbon source is at least one selected from the group consisting of petroleum pitch, coal tar pitch, natural pitch, and modified pitch; and
   a mass ratio of the silicon source to the carbon source is 1:(0.04-0.12).

8. The method of claim 6, wherein the step (1) comprises: adding the silicon source and the carbon source into an organic solvent, and then stirring ultrasonically.

9. The method of claim 6, wherein the organic lithium salt is at least one selected from the group consisting of lithium polyacrylate, lithium polymethacrylate, lithium polymaleate, lithium polyfumarate, lithium carboxymethylcellulose and lithium alginate;
   the organic lithium salt is used in an amount of 0.05-0.5 parts by weight, in relative to 1 part by weight of the silicon source;
   the step (2) comprises adding the calcined product obtained in the step (1) and the organic lithium salt into the solvent and stirring for 4-48 h.

10. The method of claim 6, wherein the vacuum freeze-drying of the step (3) is carried out at a temperature of not higher than −65° C. and a vacuum degree of not higher than 120 Pa for a time of 4-48 h.

11. The method of claim 6, wherein the method further comprises: adding graphite in the step (1) and/or the step (2).

12. The method of claim 6, wherein the method further comprises: forming a phosphorus-containing coating layer prior to the step (1) by a method comprising the steps of:
   (a) contacting the silicon-containing material, a phosphorus source and a solvent at 30-80° C. to graft the phosphorus source to the surface of the silicon-containing material; and
   (b) subjecting to a temperature programmed calcining to convert the phosphorus source around the silicon-containing material into the phosphorus-containing coating layer comprising a polymer having polycyclic aromatic hydrocarbon structural segments,
   wherein the temperature programmed calcining comprises:
   heating to a first temperature of 400-500° C. at a first heating rate,
   heating to a second temperature of 600-800° C. at a second heating rate, wherein the second heating rate is lower than the first heating rate, and
   keeping at the second temperature.

13. The negative electrode material prepared by the method of claim 6.

14. A lithium ion battery comprising the negative electrode material of claim 1, a lithium-containing positive electrode material, a separator and an electrolyte, wherein the lithium ion battery is a liquid lithium ion battery, a semi-solid lithium ion battery, or a solid lithium ion battery.

15. The negative electrode material of claim 2, wherein the phosphorus-containing coating layer comprises a polymer having polycyclic aromatic hydrocarbon structural segments, and the phosphorus-containing coating layer is made from phytic acid.

16. The negative electrode material of claim 3, wherein the negative electrode material further comprises graphite; and
   a mass ratio of a total amount of the silicon-containing material, the organic lithium salt, and the porous carbon film to an amount of graphite is 1:1-10.

17. The method of claim 8, wherein the organic solvent is at least one selected from the group consisting of N,N-dimethylformamide, N,N-dimethylacetamide, and N-methylpyrrolidone, and the calcining is carried out under an inert atmosphere at a temperature of 600-1000° C. for 10-240 min.

18. The method of claim 6, further comprising a step (4) of: mixing the product obtained in the vacuum freeze-drying in the step (3) with graphite, and the graphite is used in an amount of 1-15 parts by weight in relative to 1 part by weight of the product obtained in the vacuum freeze-drying in the step (3).

19. The method of claim 12, wherein the phosphorus source is selected from the group consisting of organic polybasic phosphoric acid, esters, and salts thereof;
   the solvent is at least one selected from the group consisting of toluene, N,N-dimethylformamide, N,N-dimethylacetamide, and N-methylpyrrolidone; and
   the temperature programmed calcining comprises heating to a first temperature of 450-500° C. at a first heating rate of 1-10° C./min; then heating to a second temperature of 600-650° C. at a second heating rate of 1-5° C./min; and keeping at the second temperature for 1-8 h.

* * * * *